Oct. 9, 1934.  C. B. WALKER  1,976,642
PUMP
Filed Feb. 17, 1934
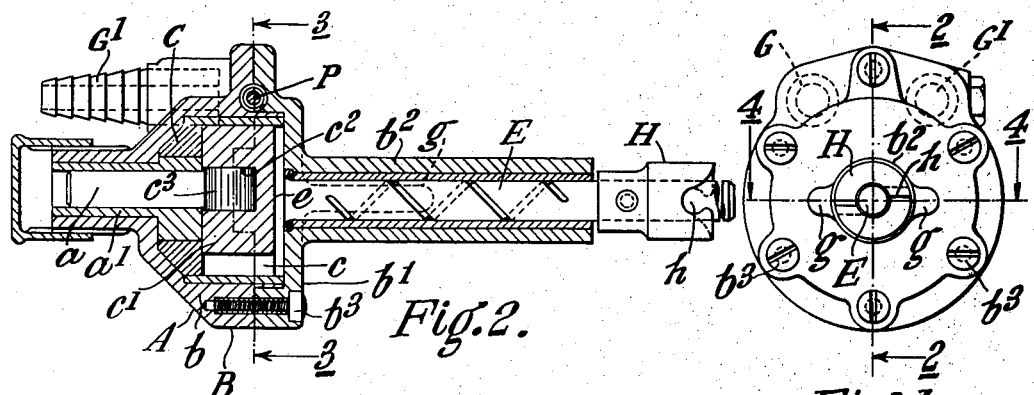
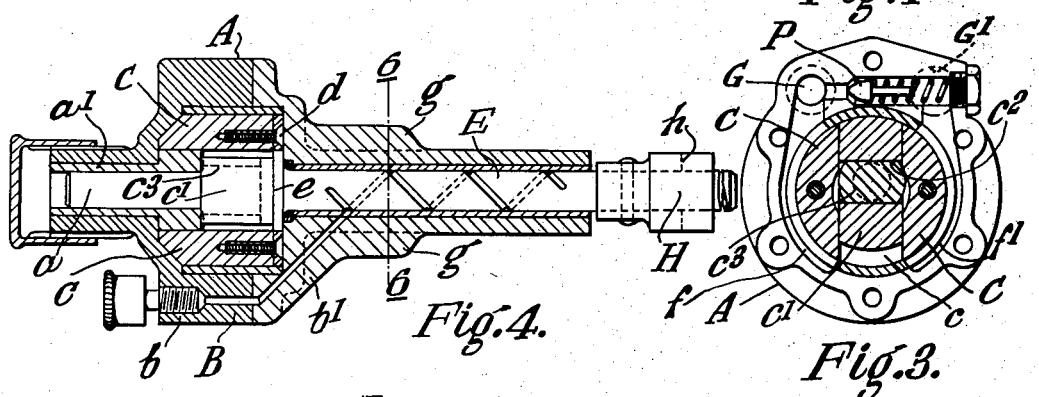
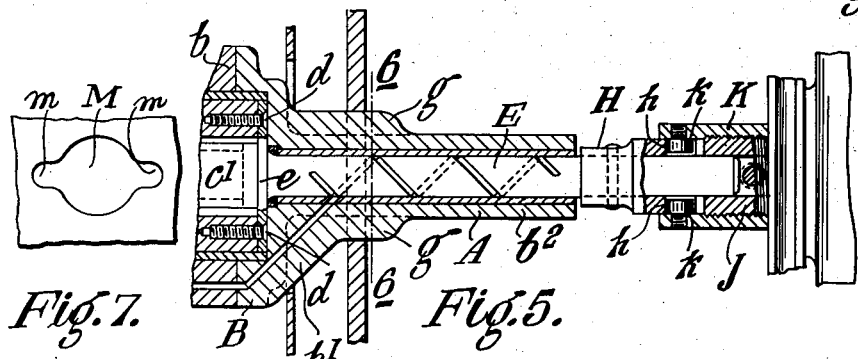
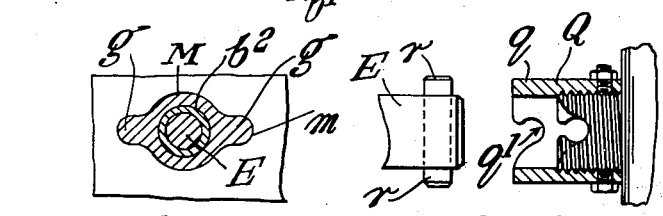

Patented Oct. 9, 1934

1,976,642

UNITED STATES PATENT OFFICE 1,976,642

PUMP

Charles Bell Walker, Banbury, England

Application February 17, 1934, Serial No. 711,662
In Great Britain December 24, 1932

2 Claims. (Cl. 103—54)

This invention relates more especially to means for supplying water under high pressure for car washing, but is applicable also to supplying water for other purposes and to supplying compressed air for inflating tyres or other purposes.

The object of the invention is to provide a pumping unit which can be applied at will to the motor vehicle in driving association with the vehicle engine, for supplying water or air or both. Preferably the driving shaft of the pump is coupled to the front of the engine shaft of a motor in the position usually occupied by the starting handle, the arrangement being such that the action of pushing the pump into operative position automatically establishes the driving connection and locks the casing of the pump against rotation, in such position that it may be run by the vehicle engine at the speed required.

In the case of many motor vehicles the shank of the starting handle passes through a bearing or support carried by the vehicle, and a peg or pegs of the inner end of the handle shank is or are adapted to engage with one-way slanted teeth or notches on the forward end of the engine shaft or a fitting which is screwed or otherwise secured thereto. In other cases the peg is on the engine shaft and the teeth or notches on the starting handle. In either case the means for coupling the rear end of the pump shaft to the engine shaft may be similar to those for coupling the starting handle to the engine shaft but they must, of course, be such that they will transmit drive from the engine shaft to the pump shaft.

The coupling between the pump shaft and the engine shaft may alternatively comprise a quick thread on the one part screwing into a counterpart thread on the other part.

The pump casing has a rearwardly extending tube to act as a bearing for the pump shaft, and also adapted to enter, as a sliding fit, into the said bearing or support which normally receives the handle shank, or into any other suitable support. Means must be provided to prevent the pump casing from revolving under torque reaction. Any convenient means may be adapted for this purpose, such as the provision of a key or projection to fit into the slot which is often provided to clear the peg on the starting handle, or an arm may be attached to the pump casing to bear against the radiator cowl or other part of the car frame. Any alternative may be adopted to prevent the pump casing from rotating.

The above method of attaching the pump need not in any way interfere with the starting handle when the pump is removed.

Any high pressure pump may be utilized in carrying out the invention, but I prefer to utilize a rotary pump in which there is a cylinder rotated about an axis which is transverse to the cylinder axis and said cylinder containing a piston rotating on an axis parallel to the axis on which the cylinder rotates but eccentric thereto, thus to cause the piston to move endwise in relation to the cylinder.

A convenient application of the invention to a water pump for car washing is described with reference to the drawing herewith in which:—

Figure 1 is a rear end view of a fitting comprising a rotary water pump.

Figure 2 is a longitudinal section of the fitting, the section being taken on the line 2, 2, of Figure 1. In this view the part comprising the short shaft and slipper head for supporting the piston is shown in elevation.

Figure 3 is a section taken in the plane indicated by the line 3, 3, of Figure 2 and looking in the direction of the arrow of that figure.

Figure 4 is a sectional plan view, the section being taken in the plane indicated by the line 4, 4, of Figure 1. In this view also the piston support is shown in elevation.

Figure 5 is a view corresponding to Figure 4 but showing in section a fitting secured to the front end of the engine shaft and engaging with the rear end of the pump shaft.

Figure 6 is a section taken in the plane indicated by the line 6, 6, of Figures 4 and 5.

Figure 7 is a view in front elevation to illustrate the shape of a recess in a front plate of a motor vehicle; and Figure 8 is a sectional view to illustrate an alternative form of coupling between the pump shaft and the engine shaft.

Referring to Figures 1 to 7, A indicates a rotary pump of a type already known. It comprises a casing B divided into two portions $b$ $b'$, the latter having a rearward tubular extension $b^2$. The portions $b$ $b'$ are secured together by set screws of which one $b^3$ is shown. C is a rotatable block having a rectangular bore $c$ (which I term the cylinder) within which is adapted to reciprocate a rectangular-section piston $c'$ which has a transverse slot $c^2$ in which slides a slipper $c^3$ integral with an eccentrically mounted stud $a$ which rotates in a bearing $a'$ in the fore end of the casing. The block C is secured by pins $d$ to a flange $e$ of a shaft E rotatable in the tube $b^2$. The flange $e$ and the forward face of the shaft E form one of the cylinder walls.

The effect of rotating the shaft E is to rotate the cylinder block and cause the piston to move endwise in relation to the cylinder in a manner already known. At the sides of the casing are two ports, one an outlet port *f* and the other an inlet port *f'* (see Figure 3). The inlet port *f'* communicates with a water inlet G' (shown only by dotted lines in Figures 1 and 3) and the outlet port *f* communicates with a water delivery pipe socket G. On the tubular extension $b^2$ are two external fins *g g*.

On the rear end of the shaft E is a fitting H having two slanted notches *h* cut in its end. It will be seen that the shaft E extends a short distance beyond the fitting H.

On the front end of the engine shaft J is screwed and pinned a hollow fitting K (see Figure 5) with two inwardly projecting studs *k* which are adapted to engage in the notches *h* of the fitting H.

When it is required to use the pump, such as for car washing, the rear end of the tubular extension is passed in through the known recess M (see Figure 7), and the notches *h* are engaged by the studs *k* (see Figure 5). When the pump is in this position its fins *g* lie in the usual gatings *m* whereby the casing cannot turn in relation to the vehicle. The direction of the slant of the notches *h* is such that the rotation of the engine shaft tends to keep the pump unit in place.

It will be seen that no additional part has to be added to the vehicle when this type of starting handle coupling is used. The handle simply has the notches sloped the opposite way. The extreme end of the pump shaft E enters the usual bore formed in the engine shaft for the purpose of centralizing the handle or pump shaft.

P (see Figure 3) indicates a known form of by-pass valve which by-passes water from the outlet port to the inlet port should the pressure become excessive such for instance as would be the case if the water jet nozzle became stopped up.

The modifications shown in Figure 8 is adapted to a vehicle in which teeth or notches are provided on the front end of the engine shaft to receive radial studs of the end of the starting handle. In this case, a sleeve Q is screwed and pegged over the front end of the engine shaft and in such position as to project forwards of the end of the engine shaft. In such extended portion *q* are cut notches *q'* adapted to engage radial studs *r* of the rear end of the pump shaft E, such studs, of course, projecting radially outwards further than the radial studs of the starting handle, the latter being such that they can pass into the extension *q* without entering the notches *q'*.

What I claim and desire to secure by Letters Patent is:—

1. A rotary pump for attachment to and operation by a vehicle having an engine shaft and a fixed member provided with an opening in front of and in alignment with the end of said shaft, said opening having at least one notch in its side, said pump comprising a casing, a movable pumping member within said casing, and a pump shaft connected to said pumping member and having a portion adapted to extend through said opening, means on the end of said shaft portion engageable by relative longitudinal movement between the shaft portion and the engine shaft to engage the end of the engine shaft, said last means holding said pump shaft against said engine shaft when the engine shaft is rotating, said casing having a portion surrounding said shaft and adapted to extend into said opening, said last portion having a rib adapted to enter said notch and thereby to lock the casing against rotation.

2. In an arrangement according to claim 1 wherein the engine shaft has pins thereon arranged radially with respect thereto, said engaging means comprising a member on the end of said shaft portion having a notch therein provided with side walls both of which slope with respect to the axis of the shaft portion.

CHARLES BELL WALKER.